Jan. 20, 1959    M. SAMUELY    2,869,325
HYDRAULIC DRIVE SYSTEM FOR PORTABLE BUILDER'S HOIST
Filed April 25, 1955    7 Sheets-Sheet 1
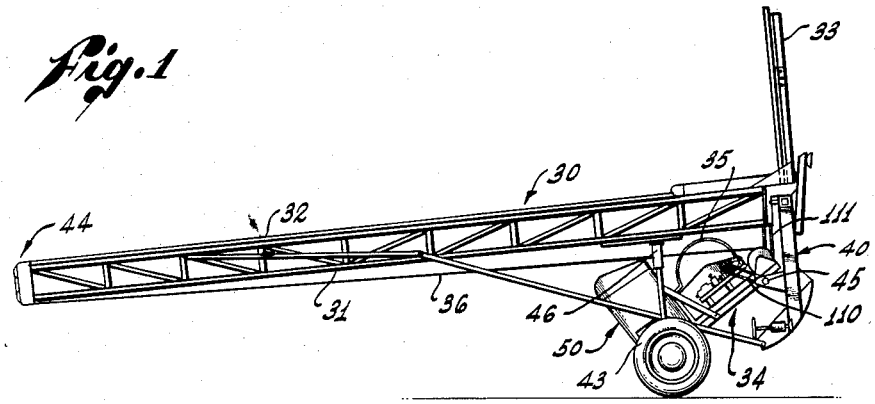
Fig. 1
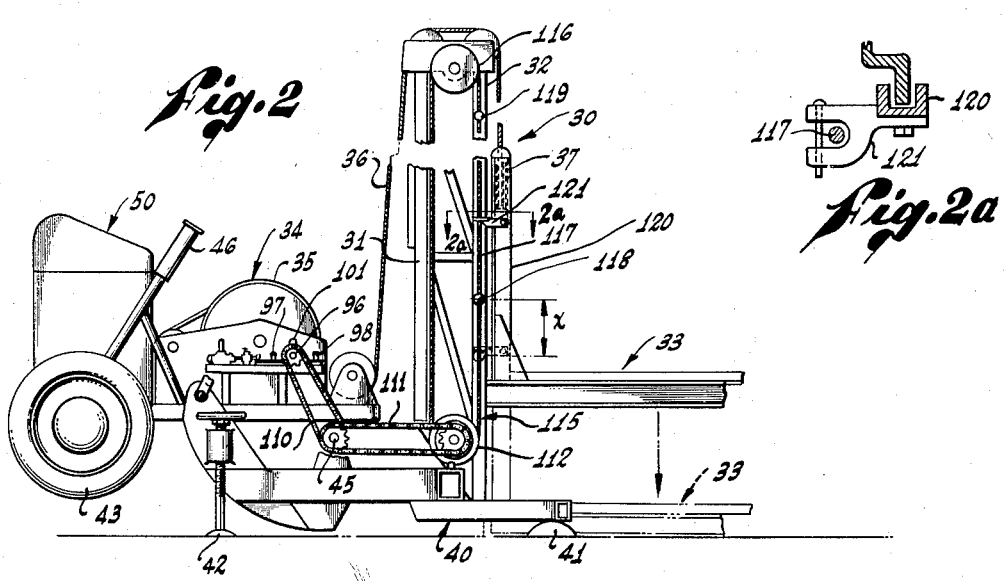
Fig. 2
Fig. 2a
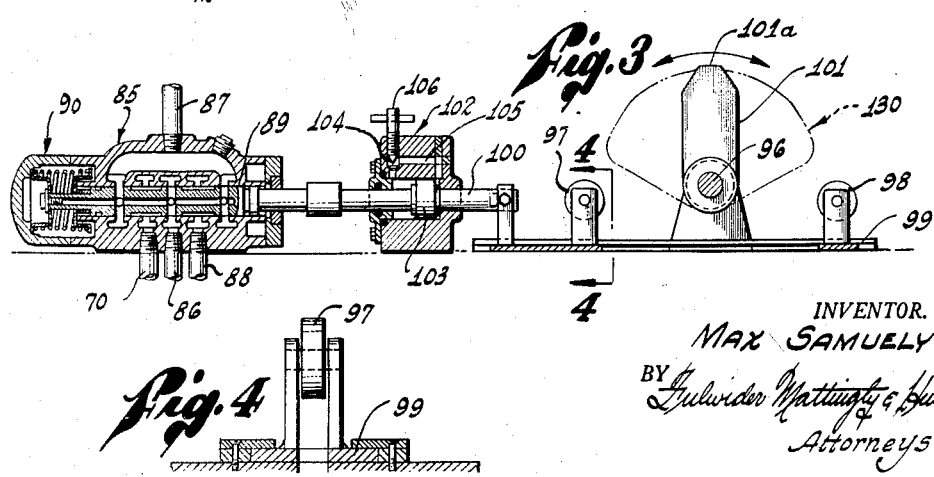
Fig. 3
Fig. 4
INVENTOR.
MAX SAMUELY
BY
Attorneys

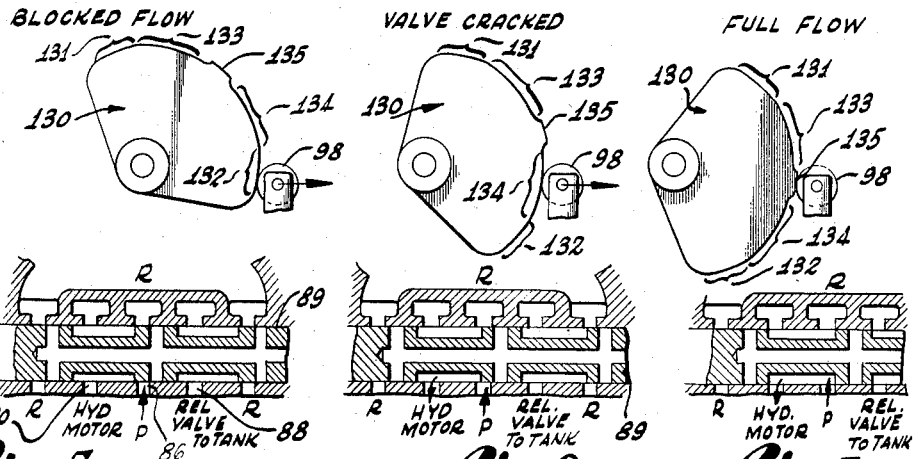
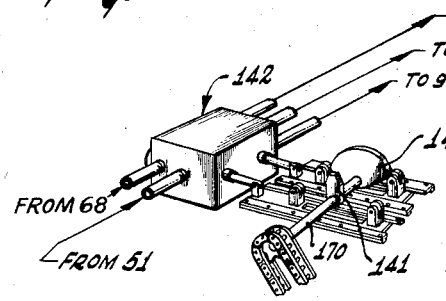
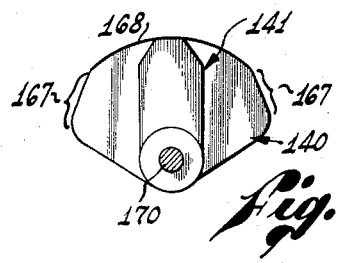
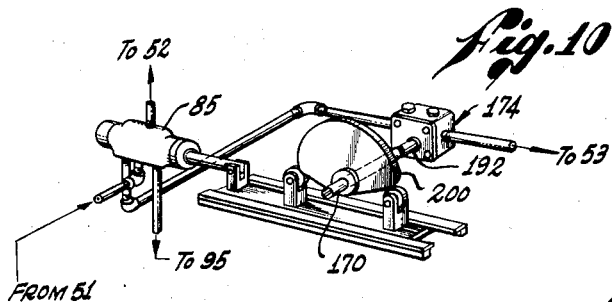
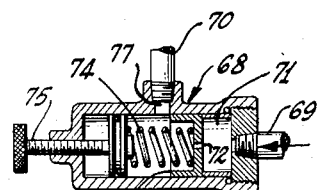
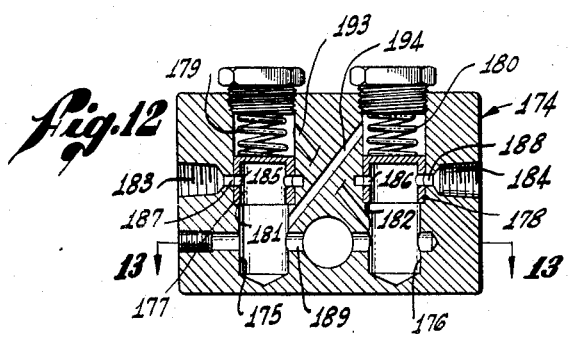
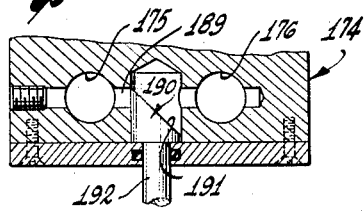

INVENTOR.
MAX SAMUELY

Jan. 20, 1959 M. SAMUELY 2,869,325
HYDRAULIC DRIVE SYSTEM FOR PORTABLE BUILDER'S HOIST
Filed April 25, 1955 7 Sheets-Sheet 4
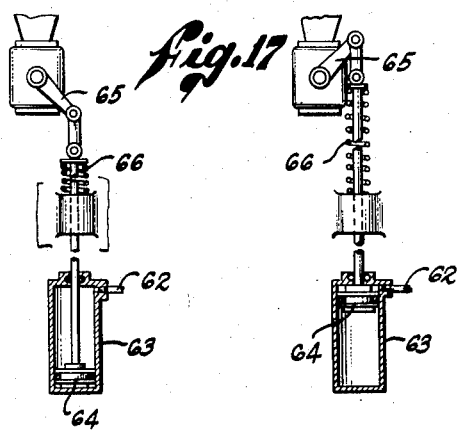
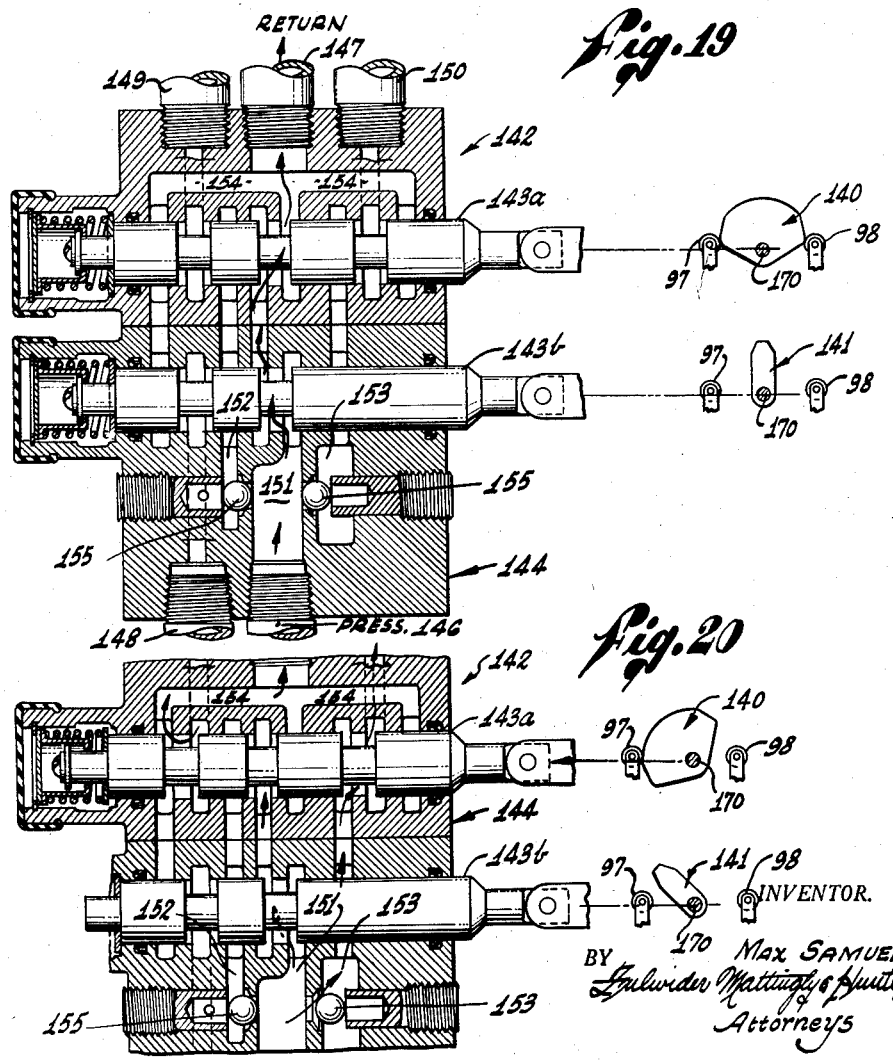
INVENTOR.
Max Samuely
BY
Attorneys Jan. 20, 1959 M. SAMUELY 2,869,325
HYDRAULIC DRIVE SYSTEM FOR PORTABLE BUILDER'S HOIST
Filed April 25, 1955 7 Sheets-Sheet 5

INVENTOR.
MAX SAMUELY
BY
Attorneys

Jan. 20, 1959      M. SAMUELY      2,869,325
HYDRAULIC DRIVE SYSTEM FOR PORTABLE BUILDER'S HOIST
Filed April 25, 1955      7 Sheets-Sheet 6
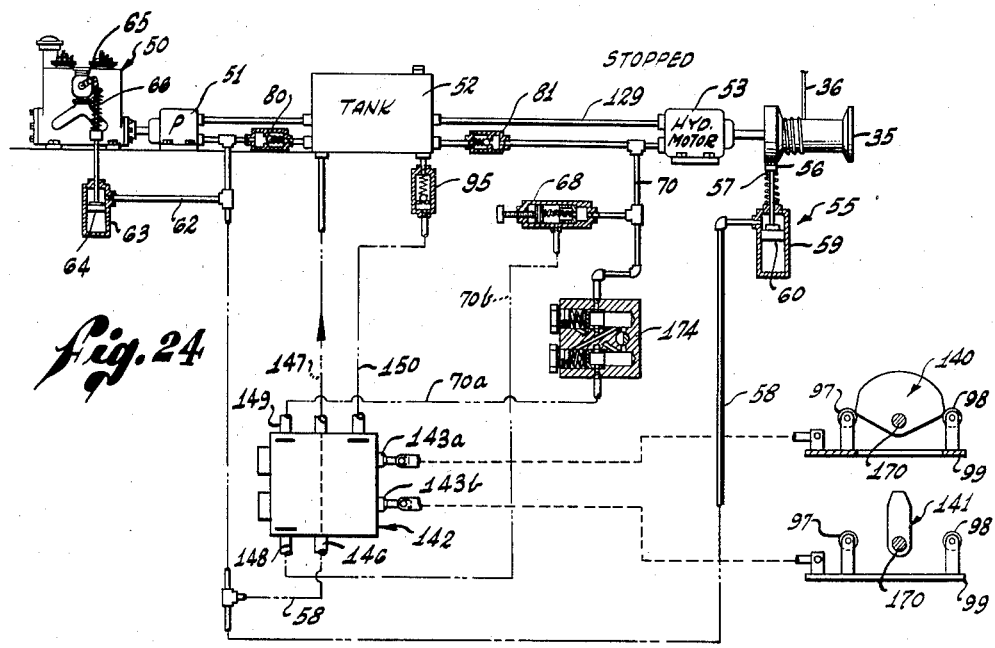
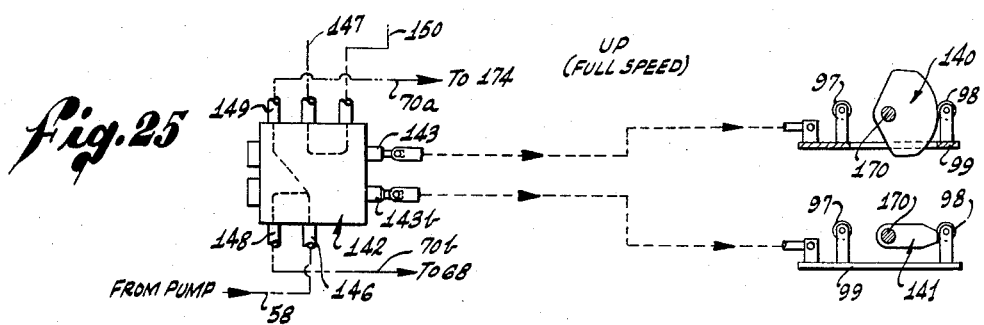
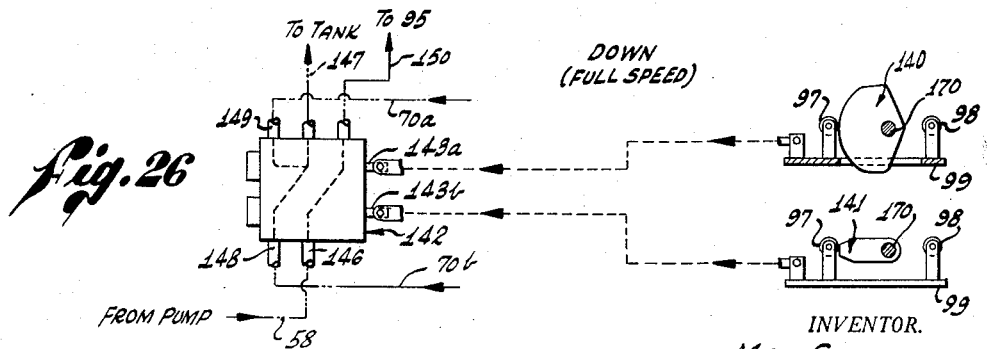
INVENTOR.
Max Samuely

INVENTOR.
MAX SAMUELY

United States Patent Office 2,869,325
Patented Jan. 20, 1959

2,869,325

HYDRAULIC DRIVE SYSTEM FOR PORTABLE BUILDER'S HOIST

Max Samuely, Los Angeles, Calif., assignor to Tubular Structures Corporation of America, Los Angeles, Calif., a corporation of California Application April 25, 1955, Serial No. 503,681

13 Claims. (Cl. 60—53)

The present invention relates generally to hoisting equipment and elevators and more particularly to a portable hoist adapted for lifting and lowering materials in the course of constructing or razing biuldings. It will be realized from the description to follow that the invention herein described is not limited to the specific embodiments shown and described, but will have application in other allied fields.

Devices of the type generally described above have been available in the past but have been subject to a number of disadvantages. Previously known hoists of this general type consist of a tower having vertical guides, a platform engaged with the guides, and a simple winch for raising or lowering the platform along the guides.

Prior to the present invention, portable hoists in general use have not been designed for rapid and efficient use in that they have not incorporated means for accelerating and decelerating the platform travel at the beginning and ends respectively of its movement up and down the tower guides. Because of the lack of such accelerating and decelerating means, the platform movement has been restricted to relatively slow speeds since the shock attendant to starting and stopping a platform at higher speed involves the risk of breakage of the winch cable or other portions of the hoisting mechanism with obvious disastrous results. Furthermore, it is desirable in hoisting plaster, mortar and other materials carried in the skips that an operator ride on the platform with the material so as to be available to stop the platform at the desired point and roll the skip off the platform at the elevated station. Abrupt stopping and starting of the platform involves severe discomfort and danger to personnel riding thereon and thus should be avoided.

Since the shocks above mentioned have been avoided in the past only by slowing down the platform movement, previous hoists have been somewhat inefficient, particularly when used for relatively high lifts in the construction of multistory buildings due to the excessive time taken for the platform to travel from the ground to the desired elevation.

Another difficulty encountered in hoists of the type described which have been available heretofore is the fact that the down-travel of the platform has been controlled solely by a mechanical friction brake which tends to become overheated upon continued use particularly in demolition and razing operations wherein the platform is loaded during the down-travel. Mechanical brakes of the type described have the additional disadvantage that they are subject to grabbing or seizure such as to impose excessive shock loads on the hoisting cable running substantial risks of breakage.

Still another disadvantage of prior devices is the fact that no satisfactory means have been provided heretofore in hoists of the class described for accurately and automatically positioning the platform at a desired elevated station while at the same time permitting relatively high speed travel during the major portion of the up-travel.

Bearing in mind the foregoing difficulties, it is a major object of the present invention to provide a portable hoist of the class described in which relatively high speeds of up and down travel may be obtained without attendant shocks at the beginning and end of such travel.

It is another object of the present invention to provide portable hoisting equipment of the class described in which the speed of up and down travel may be adjusted over a relatively wide range for various applications.

It is still another object of the invention to provide hoisting equipment of the class described which is capable of accurate and automatic placement of the hoisting platform at a desired elevated station.

It is a further object of the invention to provide equipment of the class described wherein a high speed of platform travel is combined with an automatic decelerating means which slows the platform down just prior to reaching the desired elevated station.

An additional object of the invention is to provide for fully controlled down-travel of platform in hoisting equipment of the class described without the use of mechanical friction devices.

Yet another object of the invention is to provide hoisting equipment of the class described wherein the speed and operation of the power prime mover is automatically coordinated with motion of the platform.

Yet a further object of the invention is to provide an automatic safety brake system for stopping the down-travel of the platform in the event of failure of the speed control equipment.

The foregoing and additional objects and advantages of the invention will be apparent from the detailed description to follow, consideration being given likewise to the accompanying drawings in which:

Figure 1 is an elevational view of a portable builder's hosit embodying the present invention, the same being shown in a lowered or traveling position;

Figure 2 is a fragmentary side elevational view of the hoist shown in Figure 1 in erected position ready for operation;

Figure 2a is an enlarged horizontal section taken on the line 2a—2a in Figure 2;

Figure 3 is a fragmentary elevational view partially sectioned, showing a first form of hydraulic control valve and operating cam embodied in the hoist shown in Figures 1 and 2;

Figure 4 is an elevational section taken on the line 4—4 in Figure 3;

Figure 16:
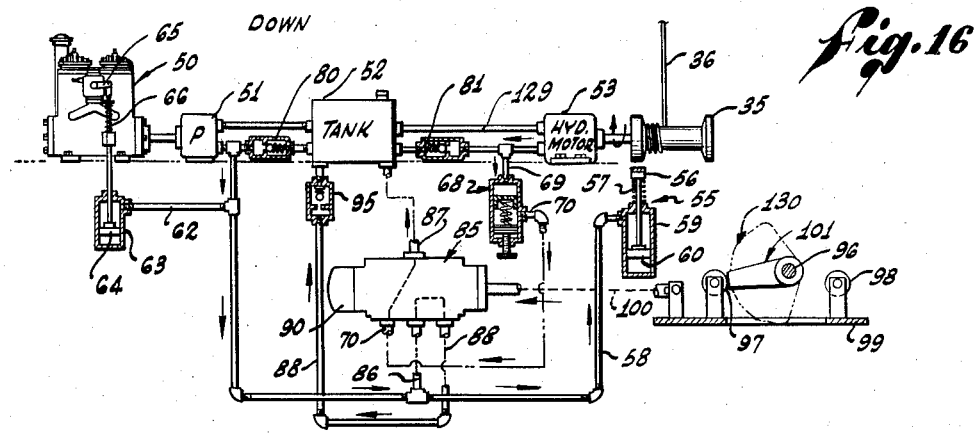
Figure 15:
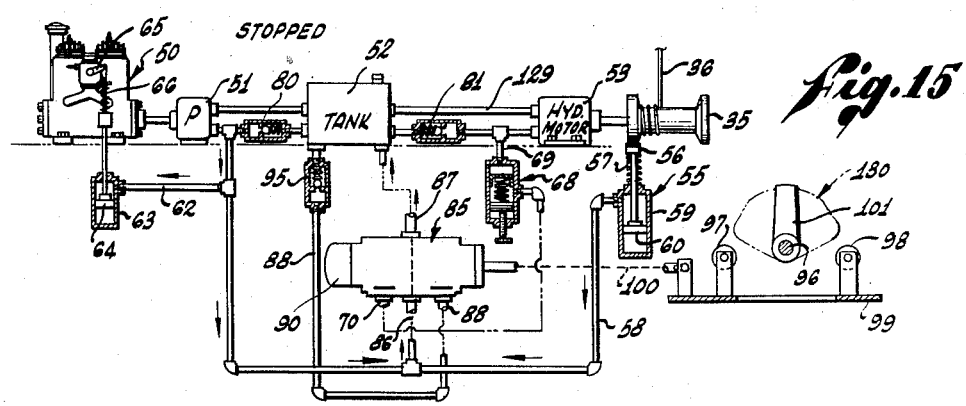
Figure 14:
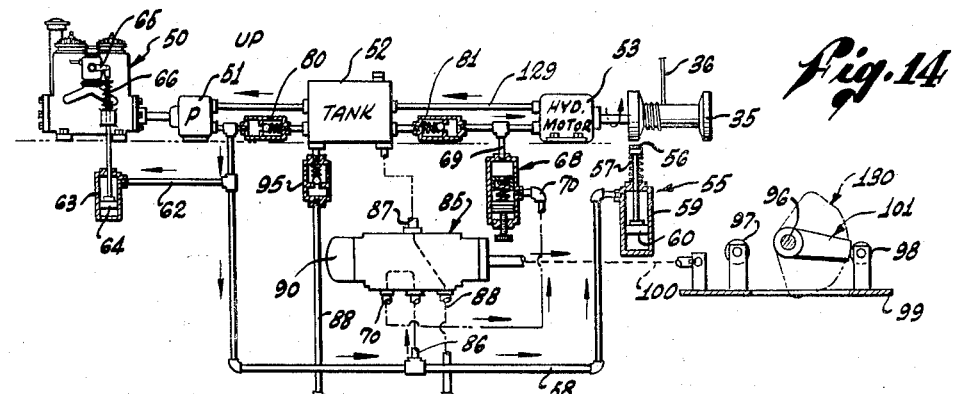

Figures 5, 6, and 7 are sequential semi-schematic views of a second form of hydraulic control valve and operating cam which may be embodied in the hoisting equipment shown in Figures 1 and 2;

Figure 8 is a fragmentary perspective view of a third form of hydraulic control valving and associated cams that may be used in the hoisting equipment shown in Figures 1 and 2;

Figure 9 is an enlarged elevational view of cams employed in the system shown in Figure 8;

Figure 10 is a fragmentary perspective view of a fourth form of hydraulic control valving and associated cams that may be used in the hoisting equipment shown in Figures 1 and 2;

Figure 11 is an axial section of a unidirectional, constant flow regulator incorporated in various of the control systems embodied in the present invention;

Figure 12 is an elevational section of a bidirectional, constant flow regulator incorporated in other alternative systems embodying the present invention;

Figure 13 is a horizontal section taken on the line 13—13 in Figure 12;

Figures 14, 15, and 16 are hydraulic circuit diagrams schematically illustrating the operation of certain forms (hereinafter termed Arrangement I) of the invention during the up-travel, stop, and down-travel conditions respectively;

Figures 17 and 18 are fragmentary—semi-schematic views of a prime mover throttle control portion of the system shown in Figures 14 through 16 showing respectively, open and closed throttle positions;

Figures 19 through 23 are axial sections through a two-spool valve and employed in the form of the invention shown in Figure 8, the valves being shown in various operational positions and the operating cams being shown semi-schematically.

Figure 29:
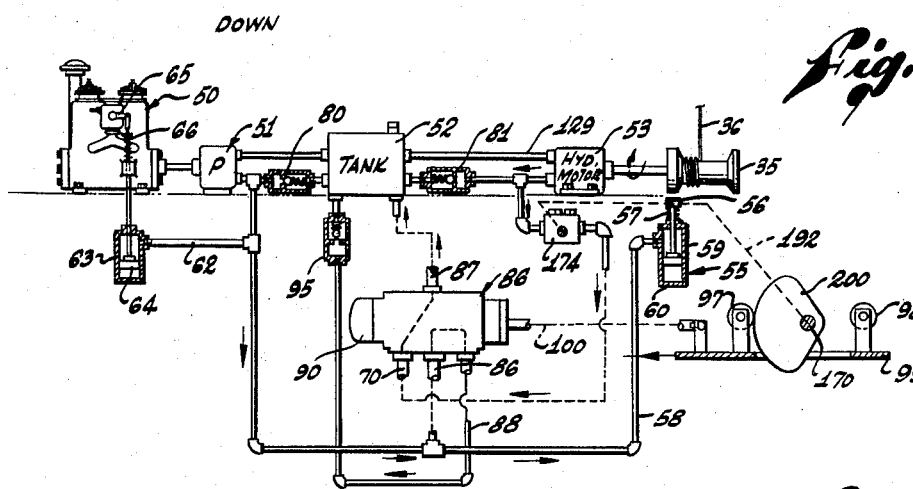
Figure 28:
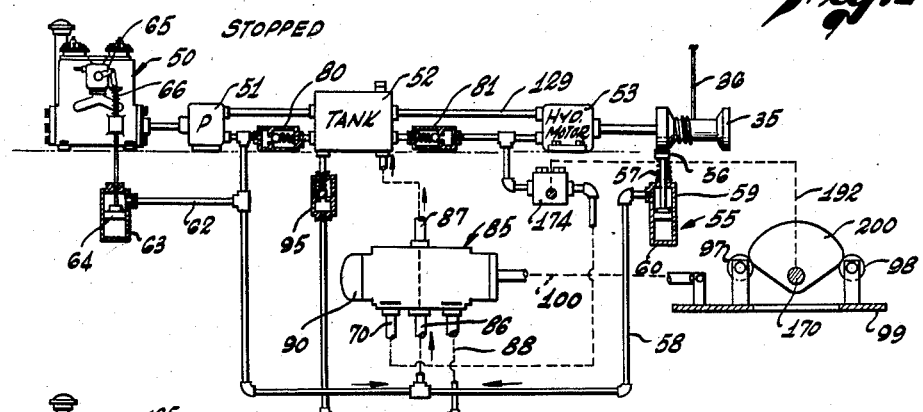
Figure 27:
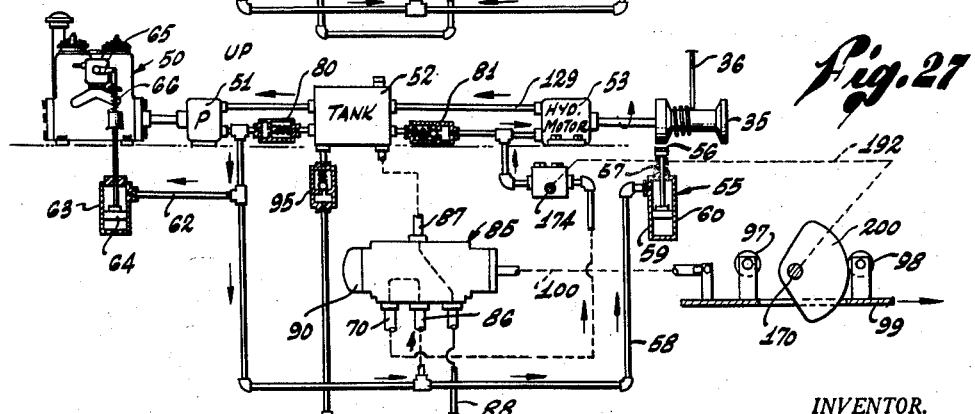

Figures 24, 25, and 26 are hydraulic circuit diagrams illustrating the operation of the form of the invention shown in Figure 8 (hereinafter termed Arrangement II) showing respectively stopped, up-travel, and down-travel conditions; and Figures 27, 28, and 29 are hydraulic circuit diagrams illustrating the operation of the form of the invention shown in Figure 10 (hereinafter termed Arrangement III) showing respectively, the up-travel, stopped, and down-travel conditions of the system.

GENERAL DESCRIPTION

The portable builder's hoist embodying the present invention is indicated in the drawings generally by the reference character 30 and comprises a frame-work tower 31 having longitudinal guide rails 32 on a forward face thereof, a load carrying platform 33 mounted for sliding movement along the rails 32, and a draw works 34 incorporating a winch drum 35 having a hoisting cable 36 reeved through conventional sheave means shown generally at 37 whereby to hoist or lower the platform 33. The hoist 30 includes a base frame 40 having suitable ground engaging pads 41 and 42, the entire structure being mounted on a pair of trailer wheels 43 whereby the hoist 30 may be drawn behind a towing vehicle being attached by conventional trailer attachment means (not shown) at the upper end 44 of the tower 31.

When it is desired to lower the tower 31 from the operative position shown in Figure 2 to the traveling position shown in Figure 1 the rearmost ground engaging pads 42 are retracted lowering the wheels 43 to the ground and the tower 31 is thereafter tilted rearwardly (counter-clockwise in Figure 2) about a horizontal pivot axis at 45 until the tower rests against abutments 46 connected to the carriage (not shown) supporting the wheels 43.

Power to operate the hoist 30 is derived from a prime mover 50, in the present case an internal combustion engine. As may be seen in Figures 14 through 16, the prime mover 50 is mechanically connected to drive a hydraulic pump 51 which may be any type of relatively high pressure pump preferably of the positive displacement type such as a gear pump, vane pump or the like. The pump 51 derives its fluid from a storage tank 52 and delivers it through control means to be described in more detail later herein to a hydraulic motor 53 which is again preferably of the positive displacement type. The hydraulic motor 53 is mechanically connected to drive the winch drum 35 to wind the cable 36 thereon and lift the platform 33.

A spring-held pressure suspended friction brake 55 is operatively associated with the winch drum 35 and fluid-connected to the hydraulic system whereby the drum 35 is held stationary by a brake shoe 56 forced into contact therewith by the compression spring 57 except when there is operative hydraulic pressure in a high pressure conduit 58 as will be described. Pressure in the conduit 58 forces fluid into the upper end of an actuating cylinder 59 causing a piston 60 to draw downwardly on the brake shoe 56 releasing the same from the drum 35 and permitting the latter to rotate. The compressive force of the spring 57 is sufficient to hold the drum 35 stationary with the platform 33 in a raised position and with the maximum permissible load thereon. The brake 55 is used only to lock the platform in a desired position and is not used to slow the down-travel of the platform 33. Other means are provided for the latter purpose as will be explained.

The hydraulic pressure system also includes a conduit 62 leading to an actuating cylinder 63 having a piston 64 therein mechanically connected to a throttle lever 65 which controls the speed of the prime mover 50. A compression spring 66 normally urges the throttle lever 65 upwardly, i. e. in a closed throttle direction. The open throttle and closed throttle conditions are illustrated in Figures 17 and 18 respectively. From the foregoing it will be seen that when there is no pressure in the conduit 62 the spring 66 closes the throttle of the prime mover 50 and the same idles. When pressurized fluid is introduced through the conduit 62 into the actuating cylinder 63, however, the piston 64 moves downwardly opening the throttle and speeding up the operation of the prime mover 50 thus increasing the power delivered to the pump 51.

In all of the forms of the invention herein described, the hydraulic motor 53 reverses its function during down-travel of the platform 33, the latter causing the cable 36 to unwind from the drum 35 and this unwinding rotation of the drum 35 in turn driving the motor 53 backward causing the same to pump fluid. The speed of the down-travel of the platform 33 may therefore be controlled by restricting the flow from the hydraulic motor 53 (now acting as a pump).

Restriction to flow from the hydraulic motor 53 during the down-travel of the platform 33 is effected by an adjustable flow regulator 68 (see Figures 14–16) which in the first form of invention takes the form of a unidirectional flow regulator, the construction of which is shown in Figure 11. In the device shown in Figure 11 flow regulation takes place only when the flow is from the motor 53, i. e. through the device in a direction entering at the conduit 69 and leaving at the conduit 70. This flow direction is indicated by the arrow in the conduit 69 in Figure 11 and it will be seen that as the fluid passes in this direction into a chamber 71 in the regulator 68 a restricted orifice 72 in a slideable piston valve member 73 therein, causes pressure to build up in the chamber 71 urging the piston 73 to the left against the yielding resistance of a spring 74. The resistance of the spring 74 may be adjusted by an abutment screw 75 by which the initial stress on the spring 74 may be varied. As the piston 73 moves to the left, the skirt thereof passes across an exit port 77 leading to the conduit 70 and thus causes an additional restriction to flow through the entire regulator 68. For any given pressure, the increased restriction at the port 77 decreases the rate of flow through the regulator 68. As such flow must all pass through the orifice 72 the decrease in rate of flow decreases the pressure in the chamber 71 thus permitting the spring 74 to move the piston 73 to the right tending to open the port 77. When these two opposing forces reach a condition of equilibrium the rate of fluid flow through the regulator 68 reaches a certain relatively constant value and it will be seen that this value is substantially the same irrespective of the pressure at the conduit 69.

Thus the maximum speed at which the motor 53 may be driven by the drum 35 during the down-travel of the platform 33 is limited to that which produces the limited flow rate through the regulator 68.

In order to prevent damage to the pump 51 or the hydraulic motor 53 in the event of a malfunction in the control system causing abnormal flow through these devices, each is connected by a high pressure relief valve to the storage tank 52. The high pressure relief valve for the pump 51 is indicated in the drawings at 80 and that for the hydraulic motor 53 is indicated at 81.

As thus far described, it will be seen that the control of the platform 33 whereby it is caused to move upwardly or downwardly as desired is accomplished by connecting the pump 51 to deliver pressure to the hydraulic motor on the one hand or alternatively connecting the output of the motor 53 to the tank 52 through the flow regulator 68 in such manner as to restrict the fluid flowing from the hydraulic motor 53. The foregoing functions are performed by various arrangements of the above described elements and modifications thereof. Three illustrative primary forms of the invention are shown and described herein being designated Arrangements I, II and III.

*Arrangement I*

The selective hydraulic connections are accomplished in Arrangement I, by means of a master control valve 85 which in the form illustrated in Figure 3, is a four-way three position spool valve.

The internal construction of the valve 85 is more or less conventional and is illustrated in Figure 3 wherein it will be seen that pressure fluid introduced at a conduit 86 may be selectively connected through internal passages in the valve to a tank connection conduit 87; a motor connection conduit 70, or an alternate return conduit 88. Selective interconnection as just described is accomplished by moving a spool member 89 axially within the body of the valve 85 in one direction or the other from a central position in which it is held by a centering spring assembly illustrated at 90.

Inasmuch as the specific details of the four-way valve employed in the present invention are conventional and inasmuch as the invention does not reside in the particular design of the valve itself, no further detailed description is deemed necessary herein. Suffice it to say, that when the spool 89 is moved to its left-hand limiting position (e. g. Figure 16) pressure fluid from the conduit 86 is connected to the alternate return conduit 88. When the spool 89 is centered (e. g. Figure 15) fluid from the conduit 86 may flow unrestricted through conduit 87 to the tank 52. With the spool 89 in the right hand position (e. g. Figure 14) pressure fluid from the conduit 86 is delivered through conduits 70 and 69 to the hydraulic motor 53.

Interposed in the return conduit 88 between the control valve 85 and the tank 52, is a flow restriction relief valve 95, the purpose of which is to maintain some pressure in the conduit 58 even when the valve is in position to return pressure fluid through the conduit 88 to the tank 52. This pressure in the system is required during down-travel as can be seen in Figure 16, in order to hold the brake-shoe 56 away from the drum 35 and permit down-travel of the platform 33 and also to maintain pressure in the conduit 62 so as to open the throttle of the prime mover 50 sufficiently to produce the pressure necessary to hold the brake "off."

At this point it should be noted that the system "fails safe" that is, in the event of a failure of the prime mover or any part of the hydraulic system, pressure is released from the brake actuating cylinder 59 or never builds up therein, thus keeping the brake "on" and preventing operation of the system until the failure is corrected.

Movement of the spool 89 back and forth from its spring centered position in the body of the valve 85 is effected by a rotary cam system mounted on a shaft 96 and adapted to engage one or the other of two cam followers rollers 97 and 98 which are in turn mounted on a common slide member 99 connected through a connecting rod 100 to the spool 89.

In one embodiment of Arrangement I illustrated in full line in Figure 3, a finger-like cam 101 (shown in full line in Figures 14–16) is employed, having a relatively restricted cam surface 101a adapted to contact the rollers 97 and 98 only at, or near the ends of its 180° rotary movement. In this form, a dash-pot 102 is operatively associated with the connecting rod 100 whereby to damp the motion of the spool 89 returning to its center position from either of its left-hand or right-hand limited positions. That is, assuming the cam 101 to have been rotated to its limiting position clockwise thus contacting the cam follower roller 98 and moving the spool 89 to its extreme right-hand position and assuming that the cam 101 is thereafter rotated to a centralized position as illustrated in full line in Figure 3, the spool 89 will return to its central position under the urging of the centering spring assembly 90. The spool will however return somewhat slowly due to the damping action of the dashpot 102 wherein a piston 103 causes fluid on one side thereof to pass through a restrictive orifice 104 and a passage 105 to the other side of the piston 103. The restriction of the orifice 104 may be adjusted by a needle valve 106. The purpose of this arrangement will be described later herein.

In all arrangements shown herein provision is made for both manual control and automatic control responsive to movement of the platform 33. As can be seen in Figure 2, the cam shaft 96 is mounted on a common base with the winch-drum 35 and prime mover 50 and is drivingly connected through sprocket chains 110 and 111 to a control cable drum 112. Two sprocket chains 110 and 111 are employed and engage separate sprockets on a common shaft coaxial with the pivot axis at 45 whereby the raising and lowering of the tower 31 does not interfere with or disturb the driving connection between the cam shaft and the cable control drum 112.

Provision for manual, as well as automatic operation of the master control valve 85 is made in the form of a control cable 115 mounted on a pair of drums or pulleys the lower one of which is the control drum 112 and the upper of which, indicated at 116, is mounted at the upper end of the tower 31 whereby to provide a length of control cable at 117 which is parallel to and closely adjacent the platform guides 32.

Clamped to the cable 115 at appropriate points along the length 117 are two stop members 118 and 119 conventionally referred to as "eggs." As can be seen in Figure 2 the platform 33 is provided at its rearward edge with a pair of vertically extending slide members 120 adapted to engage the guides 32. At the upper end of one of the slide members 120 is a fork 121 which is positioned to bracket the cable length 117 as can be seen in Figure 2A.

It will be seen that as the platform 33 reaches either its upper or lower limiting position in its travel along the tower 31, the fork 121 engages one of the other of the eggs 18 and one 19, thus moving the cable 115 and rotating the control drum 112. The rotary motion of the control drum 112 is transmitted through the previously described sprocket chain connection and cam to the valve spool 89 thus changing the position thereof. The just described control cable-sprocket chain connection to operate the valves is common to all forms of the invention illustrated herein.

As has been previously described the normal position of the valve spool 89 when not influenced by the cam 101, is in the center of its movement in the body of the valve 85. When in this position as shown in full line in Figure 3 and as is indicated schematically in Figure 15, pressure fluid entering at 86 is transmitted directly through the valve without substantial resistance and returned to the tank 52 through return conduit 87. Since there is no resistance to the flow of fluid in the manner just described substantially no pressure is developed in the conduit 58 and thus the brake shoe 56 remains against the drum 35 and the throttle 65 remains in idling position.

The normal or non-operating position of the cam 101 is shown in full line in Figure 3 wherein it will be seen that the cam is midway between the cam followers 97 and 98 and out of contact with the same.

Assuming that the platform is resting on the ground, has been loaded, and it is now desired to raise the same, the operator pulls downwardly on the cable length 117 (this motion is possible since the lower egg 118 is below the fork 121). Downward movement of the cable length 117 rotates the control drum 112, and hence the cam shaft 96 in a clockwise direction thus bringing the cam surface 101a against the cam follower 98 and moving the valve spool 89 to its right hand limiting position. This condition is illustrated in Figure 14 wherein it will be seen that the valve 85 is placed in a position to intercommunicate the pressure conduit 86 with the outlet conduit 70 which communicates through the flow regulator 68 with the hydraulic motor 53. It will be noted that in this condition the flow through the regulator 68 is in the reverse direction (as to the regulator) thus forcing the piston 73 upwardly and permitting the full flow that can pass through the orifice 72. The flow just described delivers pressurized fluid through the conduit 69 to the hydraulic motor 53 whence it is returned through a return conduit 129 to the tank 52. This in turn causes powered rotation of the drum 35 in a direction to lift the platform 33 as previously described.

It will be noted that the pressure in the conduit 58 lifts the brake shoe 56 from the drum 35 and also, through the conduit 62, operates the actuating cylinder 63 to open the throttle 65. It will also be noted that should the hydraulic system fail at any time the pressure in the conduit 58 would drop permitting the spring 57 to engage the brake 55 and hold the platform 33 at its then position along the guides 32. Similarly, such a failure would close the throttle on the prime mover 50 and prevent the same from running away due to a "no-load" condition.

Returning now to the operation of the platform 33 in an upward direction, let it now be assumed that the fork 121 reaches the upper egg 119 thus rotating the control drum 112 in a counter-clockwise direction and moving the cam 101 from its position against the cam follower 98 to its vertical disengaged position illustrated in Figures 3 and 15. Referring to the form of the invention illustrated in Figure 3 it will be realized that the return of the valve spool 89 to a centralized position under the urging of the spring assembly 90 will be damped or slowed down by the dash-pot mechanism 102 due to the fact that liquid must be forced from the left-hand side of the piston 103 through the restricted orifice 104 to the right-hand side of the piston 103. The just described damped movement of the valve spool 89 gradually cuts off the communication between the pressure conduit 86 and the output conduit 70 so that the fluid delivered to the hydraulic motor 53 is cut off gradually rather than abruptly. It has been found that if the cutoff is gradual over a period as short as one second or even less, the shock upon stopping the platform is substantially eliminated. On the other hand, if the valve spool were permitted to snap back to central position under the sole control of the spring assembly 90 the stoppage of the platform 33 is not only unduly abrupt but the shock in the hydraulic fluid system is also severe.

In addition to preventing the sudden stoppage of the platform 33, it will be seen that the dash-pot 102 imposes a yielding resistance to movement of the spool 89 to either of its left-hand or right-hand positions at the time that the cam 101 is manually moved into engagement with the followers 97 or 98. Thus, the operator is prevented from inadvertently "jamming" the valve 85 into full speed condition, imposing an undue starting load on the device.

In addition to the automatic stopping at the contact of the fork with the upper egg 119, platform 33 may of course be stopped at any desired position by an operator on the ground lifting on the cable length 117. Also, an operator riding on the platform 33 can, in the usual manner, stop the platform at any desired point by seizing the cable length 117 and lifting the same or permitting the upward movement of the platform 33 to lift the same.

When it is desired to lower the platform 33, the cable length 117 is lifted further beyond the position to which it was moved by the fork 121 whereupon through the mechanical connections previously described, the cam 101 is rotated counter-clockwise to the left-hand position against the cam follower 97 moving the valve spool 89 to its left-hand position and intercommunicating the conduit 70 leading from the hydraulic motor 53 with the return conduit 87 connected to the tank 52. At the same time, the pressure conduit 86 is connected as shown in Figure 16, to the output conduit 88 and fluid is delivered through the restrictive valve 95 to the tank 52. The pressure built up in the conduit 58 by reason of the restriction imposed at the valve 95 is sufficient to release the brake 55 and also to open the throttle 65 through the fluid actuated devices 59 and 63 previously described.

The brake 55 having been released, the weight of the platform 33 and any load thereon causes the cable 36 to unwind from the drum 35 which now drives the hydraulic motor causing the same to operate as a pump. The motor 53 then receives fluid through the conduit 129 from the tank 52 and pumps the same through the regulator 68, the conduit 70, the valve 85, and the return conduit 87 back to the tank 52. The flow rate through the regulator 68 may be adjusted by means of the adjustment screw 75 as previously described, and is adjusted to give the desired rate of downward travel of the platform. It will be noted that this downward travel rate is substantially uniform and remains approximately the same irrespective of the load on the platform 33 since the rate of down-travel is directly proportional to the rate of fluid flow through the flow regulator 68. As has been previously described, this rate of fluid flow through the regulator 68 is substantially constant irrespective of fluid pressure.

Turning now to a consideration of the form of cam operation illustrated in Figures 5, 6, and 7 (modification of Arrangement I) it will be seen that a relatively wide sector cam 130 is provided, the same having rise portions 131 and 132 at opposite ends of the effective cam surface, dwell portions 133 and 134 adjacent the rise portions 131 and 132 and a central high dwell at 135. In this form of cam control no dash-pot is required, the desired graduated operation being accomplished by the cam alone. Aside from the omission of the dash-pot, the essential elements of the control system using the sector cam 130 and the mode of operation are the same as shown and described with reference to Figures 14, 15, and 16.

The respective positions of the cam 130 and the valve spool 89 during stopping and starting are shown in Figures 5, 6, and 7. It will be seen that when the cam 130 is rotated for example clockwise to engage the follower roller 98, its first contact moves the spool 89 out of its centralized position and for a short time, blocks all flow through the valve 85. The result of this is to quickly build up pressure in the conduit 58, thus releasing the brake 55 and opening the throttle 65 in the manner previously described. The next successive position of the cam 130 and valve spool 89 is illustrated in Figure 6 wherein it will be seen that upon reaching the dwell 134, for example, the valve 85 is slightly "cracked" whereby to permit a highly restricted flow of fluid therethrough. The effect of this is to slowly start the motor 53 (either upwardly or downwardly depending on the left-hand or right-hand position of the spool 89) thus preventing an abrupt start. Such slow speed (about ½ normal speed) continues as long as the cam follower 97 or 98 is engaged with the dwell 133 or 134.

When the cam 130 is now rotated to its limit in either the right-hand or left-hand position, the engaged follower 97 or 98 is lifted onto the high dwell portion 135 whereupon the valve spool 89 is moved to the full open position as illustrated in Figure 7 causing the platform 33 to move at full speed.

*Arrangement II*

Still another cam control system Arrangement II is illustrated in Figure 8, and the operation thereof illustrated in Figures 24, 25, and 26. This arrangement has certain advantages over the previously described arrangements in that it is capable of a wider range of adjustments. Two cams are employed, one of which is a relatively wide sector cam 140 and the other of which is a finger cam 141 identical in shape to the previously described cam 101. The two cams 140 and 141 are mounted on a common cam shaft driven in the same manner as in the previous form. Each of the cams 140 and 141 operates a separate spool in a two-spool valve 142, the internal construction of which is shown in Figures 19 through 23.

The two-spool valve 142 is similar in general construction to the previously described valve having, however, two separate spools 143a and 143b mounted in two parallel bores in a two piece body 144. Each of the spools 143a and 143b is normally biased to a centralized position by a centering spring assembly 90 (see Figure 19) as in the previously described valve 85.

The body 144 of the valve 142 is formed with external fluid connections 146, 147, 148, 149 and 150 between which various intercommunications may be established as will be described. The connection at 146 receives fluid under pressure during the up-travel operation of the device and is therefore referred to as the pressure connection. Similarly the connection 147 communicates the valve with the fluid receiving tank and is therefore referred to as the return or tank connection.

When both of the spools 143a and 143b are in their central positions (Figure 19) annular grooves therein are so positioned that fluid may pass unimpeded through a central tortuous passageway 151 from the pressure connection 146 to the return connection 147. Displacement of either spool 143a or 143b in either direction interrupts the passageway 151 and thus prevents fluid from flowing directly through the valve to the return connection 147.

In the body 144 on each side of the central passageway 151 are two pressure passageways 152 and 153 each communicated through a check valve 155 with the central passageway 151. The passageways 152 and 153 serve to establish, selectively, communication through the valve 142 between the pressure connection 146 and one or more of the external connections 148, 149, and 150.

Referring to Figures 19 through 23, selective pressure communication is accomplished by cam actuated movement of the spools 143a and 143b as follows. When the upper spool 143a is moved to the left as shown for example in Figure 20, the connection 146 is communicated through the passageway 153 with the connection 150 and when said spool is moved to the right as shown for example in Figure 22, the connection 146 is communicated through the passageway 152 with the connection 149.

Figure 23:
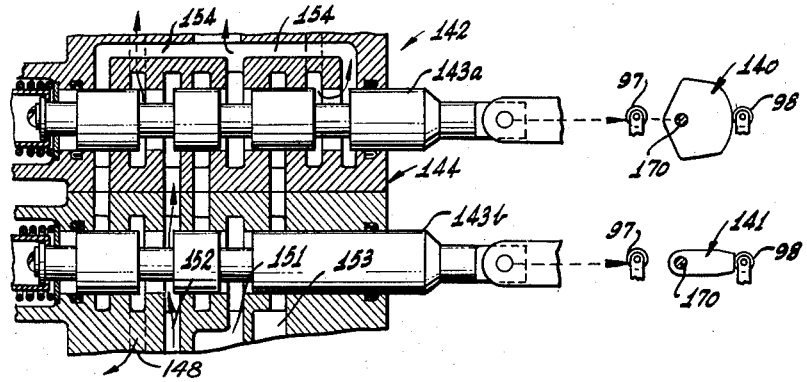

When the lower spool 143b is also moved to the right as shown in Figure 23, the connection 146 is communicated through the passageway 152 with the connections 148 and 149.

The spool movements just described also establish return communication with the connection 147 as follows. When the upper spool 143a is moved to the left as shown in Figure 21, the return connection 147 is communicated through a branched passageway 154 with the connection 149 and when said spool is moved to the right as shown in Figure 22, the return connection 147 is communicated through the passageway 154 with the connection 150.

Figure 21:
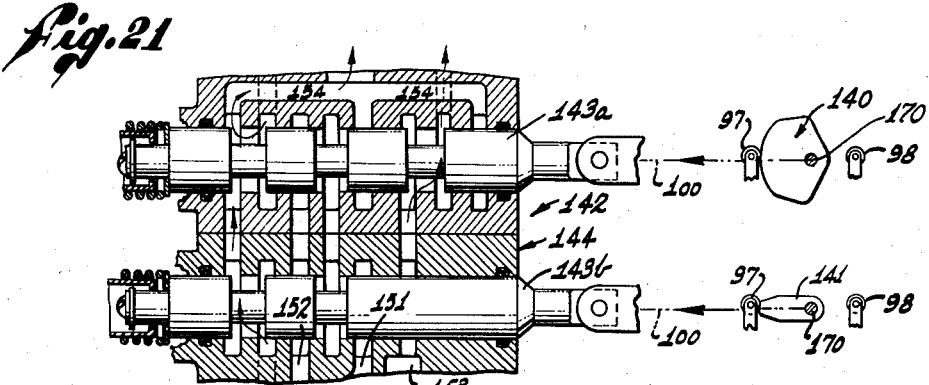
Figure 22:
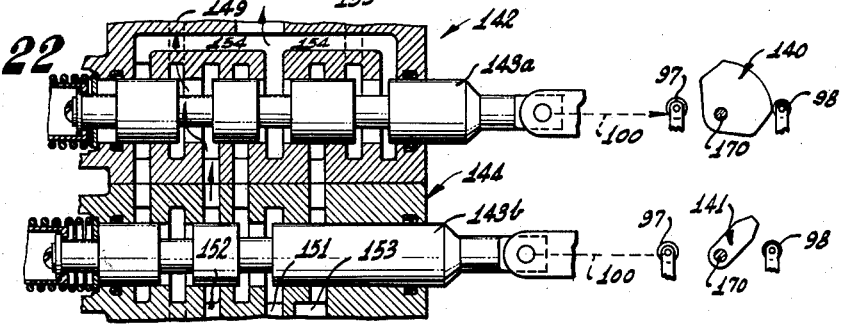

When the spool 143b is moved to the left as shown in Figure 21 the return connection 147 is communicated through the passageway 154 with the connection 148. The various combinations of spool movement shown in Figures 20 through 23 depend, it will be seen, on whether one or both of the cams 140 and 141 contact their respective cam followers.

The hydraulic circuit employing the two-spool valve 142 is illustrated in Figures 24 through 26, the latter being respectively the "stopped," "full-speed up," and "full-speed down," conditions of the system. In the latter figures, all components which are identical in structure and function to those in Figures 14 through 16 bear the same respective reference characters.

The arrangement of the two-spool valve system is in many respects similar to the system shown in Figures 14 through 16, the principal difference being that in the two-spool system illustrated in Figures 24 through 26, the flow is directed in two parallel flow paths under the respective control of the valve spools 143a and 143b.

The operation of the hydraulic circuit controlled by the lower spool 143b is essentially the same as that shown in Figures 14 through 16. A uni-directional flow regulator 68 is included in a conduit 70b leading from the fluid connection 148 so that when the valve spool 143b is in its right-hand position as shown for example in Figure 25 and in Figure 23, pressure fluid is delivered from the conduit 58 connected to the valve 142 at 146 through the conduit 70b the unidirectional flow regulator 68 to the hydraulic motor 53. This drives the motor 53 in a direction to raise the platform 33.

Conversely, if the lower spool 143b is moved to the left-hand position as shown in Figure 26 and in Figure 21, fluid from the hydraulic motor 53 now acting as a pump is delivered through the conduit 70, the uni-directional regulator 68 which now restricts the flow, the conduit 70b, and the valve 142 to the tank. Thus the platform 33 would descend at a controlled rate.

In addition to the operation just described, however, controlled flow of fluid takes place through an alternate conduit 70a and a bi-directional regulator 174, the construction of which is illustrated in Figure 12.

In Figure 12 it will be seen that two bores 175 and 176 are provided in the body of the regulator 174 and have therein movable pistons 177 and 178. Compression springs 179 and 180 urge the respective pistons 177 and 178 downwardly against shoulders 181 and 182 in the respective bores 175 and 176. Controlled flow through the regulator 174 may be in either direction between connections at 183 and 184.

The regulation is effected by the pistons 177 and 178. With the pistons 177 and 178 against the shoulders 181 and 182 respectively, the flow is at minimum restriction since ports 185 and 186 in the pistons 177 and 178 respectively fully align with annular chambers 187 and 188 communicated with the connections 183 and 184 respectively.

Thus assuming the flow to be from left to right in Figure 12, it will be seen that fluid passes inwardly through the annular chamber 187, through the ports 185, downwardly through the bore 175, and transversely through a lateral passageway 189 to the bore 176. From the bore 176 the fluid moves upwardly and out through the ports 186, the annular chamber 188, and leaves the valve at the connection 184.

Interposed in the transverse passageway 189 is an adjustable cylindrical valve member 190 which, as can be seen in Figure 13 is formed with an oblique surface 191 and thus by rotation serves to gradually open or close the passageway 189. A control shaft 192 permits manual or other controlled rotation of the throttle or valving member 190 to adjust the restriction in the passageway 189.

The bores 175 and 176 are mutually interconnected above and below their respective pistons 177 and 178 by crossed passageways 193 and 194. Thus, the pressure in each bore 175 and 176 below the piston therein is applied to the upper side of the piston in the opposite bore.

It will be seen that the effect of the just described structure is to maintain a substantially constant flow through the regulator 174 irrespective of the direction of flow. The operation is as follows. Assuming the flow to be from the connection 183 to the connection 184, it will be seen that the first effect due to a pressure rise in the bore 175 is to move the piston 177 upwardly cutting down the flow at the ports 185. Upward motion of the piston 177 is however, resisted by the spring 179 and also by the pressure in the bore 176 applied to the upper-side of the piston 177 through the passageway 193.

It will be seen that if the fluid pressures in the bores 175 and 176 were equal, the fluid pressure forces acting on the piston 177, for example, would be substantially neutralized leaving only the residual unbalanced pressure of the spring 179 which would force the piston downwardly in to a full open position of the ports 185. Pressures in the bores 175 and 176 are not equal however, so long as there is any fluid flowing through the valve and any restriction in the transverse passageway 189. The greater the rate of flow through the regulator 174, the greater the pressure drop across the transverse passageway 189 for any given restriction therein. Accordingly it will be seen that theoretically a position of equilibrium could be reached at which the pressure differential between the bores 175 and 176 plus the force of the spring 179 would produce a certain displacement of the piston 177. This displacement would produce the required restriction in the ports 185 to cut down the flow through the transverse passageway 189 to that which produced the desired pressure differential between the bores 175 and 176.

In certain idealized conditions this position of equilibrium in which the piston 177 remains motionless can be achieved. In practice however, it has been found that the piston 177 oscillates in the bore 175 and the integrated effect of the restriction at the ports 185, is such as to produce substantially uniform flow through the regulator 174 for any given setting of the restrictor valve 190, such flow rate remaining substantially constant in spite of very wide variations in pressure at the valve connection 183.

The foregoing description of the operation of the regulator 174 has been given in connection with the piston 177 which is the operative piston when the flow is from the connection 183 to 184. Inasmuch as the regulator 174 is of bilaterally symmetrical construction, it will be realized that when the flow is from the connection 184 to 183, the right-hand piston 178 becomes the operative regulator and operates in exactly the same manner described in connection with the piston 177.

Adverting to the discussion of the hydraulic circuit illustrated in Figure 24 (Arrangement II), it will be seen that the upper valve spool 143a which controls fluid flow to and from the bi-directional regulator 174 is operated by the relatively wide angle sector cam 140 which is formed with rise portions 167 adjacent the ends of the effective cam surface and a relatively wide central dwell at 168.

Thus, the initial rotation of the control cam shaft 170 on which the two cams 140 and 141 are mounted moves the valve to a "block flow" position equivalent to that illustrated schematically in Figure 5. This in turn causes an increase in the pressure conduit 58 which serves to release the brake 55 and open the throttle 65 as described in the previous embodiments.

Upon continued rotation of the cam shaft 170 to a position in which the cam 140 moves the valve 142 to full open position say in the up-direction as illustrated in Figure 22, but the finger cam 141 is still out of engagement with its cam followers, it will be seen that communication is established between the pressure connection 146 and the connection 149 so that pressure fluid is delivered through the conduit 70a, the regulator 174, and the conduit 70 to the hydraulic motor 53. Due to the back pressure of the regulator 174, only a portion of the fluid produced by the pump 51 is delivered to the hydraulic motor 53, the other portion passing through the high pressure relief valve 80 to the tank. Thus the hydraulic motor operates at only a portion of its full speed and the platform 33 starts up slowly.

When the cam shaft 170 is rotated to its extreme up-position, the condition illustrated in Figure 25 obtains and the full complement of fluid from the pump 51 is delivered through the conduits 70a and 70b and the respective regulators 68 and 174 to the hydraulic motor 53 and the platform moves upwardly at full speed.

As the platform approaches its upper limit and the fork 121 engages the upper egg 119, the cam shaft 170 is rotated to the position shown in Figure 22 whereupon the platform completes its travel at half speed until the cams are moved to the centralized position shown in Figure 24 whereupon the platform 33 stops.

The down-travel operation is essentially the reverse of that just described, the initial movement of the cam shaft 170 first operating the valve spool 143a as shown in Figure 20 to connect the conduit 70a to the tank. At the same time, pressure is built up in the conduit 58 by directing the flow therefrom through the relief valve 95 which causes sufficient back pressure to release the brake and open the throttle as previously described. At this point, as shown in Figure 20, the finger cam 141 is still out of contact with its cam follower, thus leaving the lower spool 143b in blocked position and permitting fluid to escape from the hydraulic motor 53 only through the regulator 174 which is relatively highly restrictive. Thus the platform moves downwardly at a slow rate. Further rotation of the cam shaft 170 to the position shown in Figures 21 and 26 shifts both spools 143a and 143b and permits the fluid to pass from the hydraulic motor through both the regulators 68 and 174 thus permitting downward movement at full speed. Again, as the platform 33 nears the lower limit of its travel, the cam shaft 170 is turned to the position shown in Figure 20 and the platform now moves downwardly at reduced speed until it reaches its lower limit centering the cams as shown in Figure 19.

*Arrangement III*

Still another embodiment of the invention involving a different arrangement of parts previously described is illustrated in Figure 10 and the operation thereof is illustrated in Figures 27 through 29. Again, parts having the same function and structure as those in previously described embodiments are identified by the same reference characters.

Arrangement III illustrated in Figures 10 and 27 through 29 embodies the same control valve 85 as in Arrangement I, a bi-directional flow regulator 174 as previously described, and a simple sector cam 200 having an effective cam surface such as to move the spool of the valve 85 to its full open position in one direction or the other at all positions of the cam 200 except the central position illustrated in Figure 10 and Figure 28.

In Arrangement III the cam shaft 170 is drivingly connected to the control shaft 192 of the bi-directional regulator 174. Thus the degree of restriction imposed by the regulator 174 is varied as the cam shaft 170 is rotated. This mechanical interconnection is indicated by a dotted line at 192 in Figures 27 through 29.

The operation shown in Figures 27 through 29 is as follows. As the cam shaft 170 starts to rotate, the system is connected to deliver fluid to the hydraulic motor 53, the same passing, however, through the regulator 174. The latter being initially, highly restrictive, the hydraulic motor 53 starts at relatively low speed. As the cam shaft 170 is rotated toward its limiting position shown in Figure 27, the control shaft 192 of the regulator 174 is rotated in a direction to decrease the restriction of the regulator 174 thus allowing more and more fluid to pass to the hydraulic motor 53 increasing its speed. Similarly, rotation away from the position shown in Figure 27 increases the restriction of the regulator 174 slowing the motor 53.

Operational control of the device in a "down" direction is substantially the opposite to that just described.

While the forms of the device shown and described herein are fully capable of achieving the objects and providing the advantages hereinbefore stated it will be realized that they are capable of considerable modification and rearrangement without departure from the spirit of the invention. For this reason, I do not mean to be limited to the forms shown and described but rather to the scope of the appended claims.

I claim:

1. In a power hoisting system a hydraulic transmission comprising: a source of pressurized fluid; a reservoir; a hydraulic motor-pump having a fluid connection and being adapted to be driven in one direction to deliver mechanical power when supplied with pressurized fluid at said fluid connection and to deliver pressurized fluid at said connection when mechanically power driven in the opposite direction; conduit means connected between said source, reservoir, and said fluid connection in said motor-pump to provide flow paths from said source to said motor-pump and from the latter to said reservoir; first valve means interposed in said conduit means and having three operative positions, to wit, a "stop" position in which said fluid connection is absolutely blocked, an "up" position in which said source is communicated with said fluid connection in said motor-pump, and a "down" position in which said fluid connection in said motor-pump is communicated with said reservoir; second valve means interposed in said conduit means and movable to a "reduced speed" position to partially open said conduit means to permit restricted flow of fluid through said fluid connection in said motor-pump; and an actuator mechanically linked to said two valve means, said actuator being movable in either direction from a central position to opposite limits of a given path, said actuator being so linked to said first valve means as to hold the same in said "stop" position when in said central position and move said first valve means to said "up" position when moved to one of said limits, and move said first valve means to said "down" position when moved to the other of said limits, said actuator also being so linked to said second valve means as to move the same to said "reduced speed" position upon initial movement of said actuator in either direction from said central position thereof.

2. The construction of claim 1 further characterized in that the linkage between said actuator and said first valve means includes a cam and follower engageable therewith, said cam being so shaped as to permit movement of said actuator over a substantial part of said path in either direction from said central position without corresponding movement of said first valve means.

3. The construction of claim 2 further characterized in that said first valve means incorporates yieldable centering means urging the same to said "stop" position.

4. The construction of claim 1 further characterized in that said first and second valve means are arranged in said conduit means for parallel fluid flow therethrough to and from said motor-pump, and by having linkage between said actuator and said first valve means which includes lost motion means to permit substantial movement of said actuator in either direction from said central position thereof before actuating said first valve means, whereby to effect reduced speed operation of said motor-pump through said second valve means before actuating said first valve means.

5. The construction of claim 4 further characterized in that said linkage includes two cams mounted on a single movable element connected to said actuator, two cam followers one engageable by each cam, said followers being connected to the respective valve means to operate the same when moved by said cams, the cam operating the first valve means being so shaped as to engage its follower only adjacent said limits, and the cam operating said second valve means being so shaped as to engage its follower immediately upon said movable element being moved from said central position.

6. The construction of claim 1 further characterized in that said first valve means is communicated with said motor-pump through a first separate passageway in said conduit means, said first separate passageway having unidirectional flow limiting means therein limiting the flow rate from said motor-pump to a predetermined volume per unit time while permitting relatively unrestricted flow through said first separate passageway to said motor-pump.

7. The construction of claim 6 further characterized in that said unidirectional flow limiting means includes an element responsive to the pressure of fluid delivered from said motor-pump and movable to increase the restriction to said flow upon an increase of said pressure whereby to maintain said flow rate relatively constant irrespective of said pressure.

8. The construction of claim 6 further characterized in that said second valve means is communicated with said motor-pump through a second separate passageway in said conduit means, said second separate passageway having bi-directional flow limiting means therein limiting the flow rate in either direction through said second separate passageway to less than said predetermined volume per unit time.

9. The construction of claim 8 further characterized in that said bi-directional flow limiting means includes a restrictive orifice interposed in the flow path therethrough and movable means responsive to the pressure drop across said orifice to increase restriction to said flow upon increase of said pressure drop whereby to maintain a relatively constant flow rate through said second valve means irrespective of fluid pressure applied thereto.

10. The construction of claim 1 further characterized in that said first and second valve means are connected in series and said second valve means includes a movable throttling element linked to said actuator to decrease resistance to flow through said second valve means as said actuator is moved in either direction from said central position thereof.

11. The construction of claim 10 further characterized in that said second valve means includes movable means responsive to the pressure drop across said throttling means and movable to increase the restriction to said flow upon increase in said pressure drop whereby to maintain a relatively constant flow rate for any given setting of said throttling element irrespective of fluid pressure applied to said second valve means.

12. The construction of claim 1 further characterized in that said second valve means includes a throttling member which continuously varies the restriction to flow through said fluid connection in said motor-pump, said throttling member being directly connected to actuator for concurrent movement therewith, said restriction being at a maximum with said actuator is in central position and decreasing as said actuator is moved toward either of said limits.

13. The construction of claim 12 further characterized in that the linkage between said actuator and first valve means includes a cam and follower engageable thereby, said cam being so shaped as to move said first valve means to its respective "up" or "down" position immediately upon said actuator being moved from said central position.

References Cited in the file of this patent

UNITED STATES PATENTS

| | | |
|---|---|---|
| 1,318,399 | Manly | Oct. 14, 1919 |
| 2,321,880 | Vickers | June 15, 1943 |
| 2,407,692 | Vickers | Sept. 17, 1946 |
| 2,416,801 | Robinson | Mar. 4, 1947 |